United States Patent [19]
Uchida et al.

[11] Patent Number: 5,459,918
[45] Date of Patent: Oct. 24, 1995

[54] METHOD OF AND APPARATUS FOR ADJUSTING PHASES OF BODIES OF ROTATION

[75] Inventors: Koji Uchida, Higashihiroshima; Kinji Matsubara, Shijonawate, both of Japan

[73] Assignees: Mazda Motor Corporation, Hiroshim; Matsushita Electric Industrial Co., Ltd., Osaka, both of Japan

[21] Appl. No.: 91,838

[22] Filed: Jul. 13, 1993

[30] Foreign Application Priority Data

Jul. 13, 1992 [JP] Japan ..................... 4-209711

[51] Int. Cl.⁶ .............................. B23P 11/00; B23P 19/00
[52] U.S. Cl. .................. 29/434; 29/464; 29/468; 29/893.1
[58] Field of Search ...................... 29/434, 893.1, 29/893.2, 464, 466, 468, 281.4, 281.5, 240

[56] References Cited

U.S. PATENT DOCUMENTS 4,887,344 12/1989 Kurihara et al. ..................... 29/468

FOREIGN PATENT DOCUMENTS

| 63-134385 | 6/1988 | Japan . | |
|---|---|---|---|
| 5-253761 | 10/1993 | Japan | 29/468 |
| 1535691 | 1/1990 | U.S.S.R. | 29/893.2 |

Primary Examiner—S. Thomas Hughes
Attorney, Agent, or Firm—Keck, Mahin & Cate

[57] ABSTRACT

A first mechanical unit and a second mechanical unit, each of which has bodies of rotation arranged so as to be rotatable independently from one another, are assembled together with engagement between their bodies of rotation. After first concentric engaging members of a first engaging mechanism, rotatable independently from one another, are engaged with the bodies of rotation of the first mechanical unit, respectively, second concentric engaging members of a second engaging mechanism, rotatable independently from one another, are integrated with the first concentric engaging members together in rotational angular phase. Then, the second concentric engaging members are engaged with the second bodies of rotation of the first mechanical unit, respectively, so as to adjust the bodies of rotation of the first and second mechanical units in rotational angular phase.

9 Claims, 10 Drawing Sheets

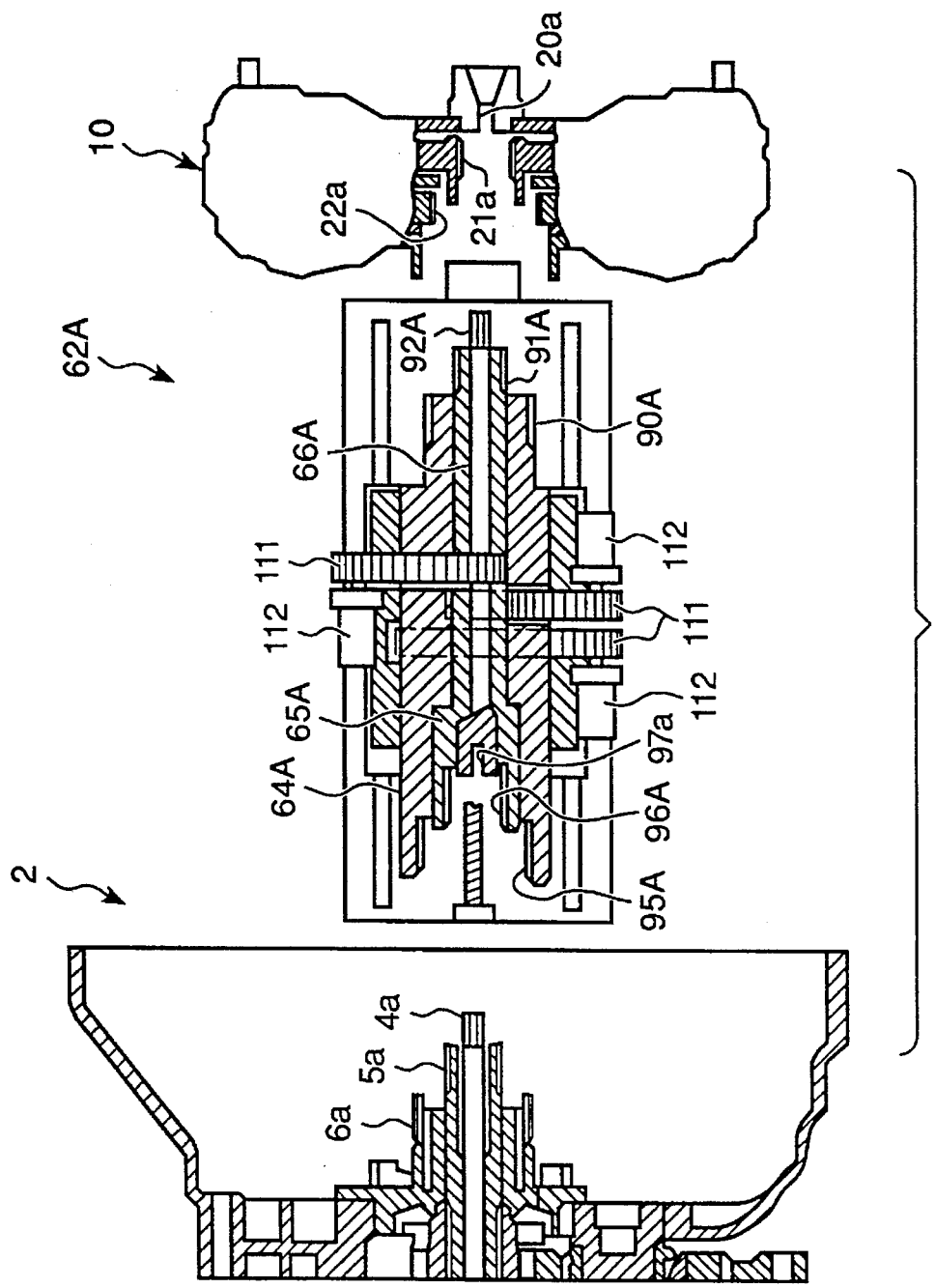

METHOD OF AND APPARATUS FOR ADJUSTING PHASES OF BODIES OF ROTATION

BACKGROUND OF THE INVENTION

1. Field of the Invention

This invention relates to a method of and apparatus for adjusting phases of bodies of rotation.

2. Description of Related Art

Typically, automatic transmissions include torque converters operationally interconnected with transmissions. Such a torque converter and a transmission are assembled by engagement of splined shafts of the torque converter, such as a pump shaft, a turbine shaft and a stator support shaft with splined shafts formed with a converter housing, a turbine support and a one-way clutch, respectively, of the transmission. In a conventional manner, while the torque converter is being assembled to the transmission, it is driven by manual operation so as to adjust phases of the splined shafts of the torque converter to phases of the splined shafts of the transmission so that the splined shafts are properly positioned when they are brought into engagement. Since torque converters are too heavy for workers to easily manually handle and drive, this is difficult.

In an attempt to automate transmission assembling tasks, a phase adjusting apparatus provided with a first phase adjusting unit, having a splined master shaft, and a second phase adjusting unit, having a splined master sleeve, has been proposed. After spline-coupling, on one hand, the splined master shaft of the first phase adjusting unit to a splined body of rotation of the torque converter and, on the other hand, the splined master sleeve of the second phase adjusting unit to a splined shaft of the transmission, either the body of rotation of the torque converter or the shaft of the transmission is driven, while monitoring phases of the body of rotation of the torque converter and the shaft of the transmission by the use of an encoder, so as to avoid a phase difference between the two. Such a phase adjusting apparatus is known from, for instance, Japanese Unexamined Patent Publication No. 63-134385.

Although the phase adjusting apparatus described in the above-mentioned publication greatly simplifies assembling operation of torque converters to transmissions, it takes a relatively long time to perform assembling of the transmission. Further, since the first and second phase adjusting units are independently operated to adjust phases between a body of rotation of a torque converter and a shaft of a transmission, the apparatus is large in overall size and needs to be provided with a plurality of sets of motors and encoders, leading to a high manufacturing cost.

SUMMARY OF THE INVENTION

It is therefore an object of the present invention to provide a method of and apparatus for adjusting phases between bodies of rotation and rotatable shafts which is simple in structure and enables complete assembling of a transmission in a short time.

The foregoing object of the present invention is accomplished by providing a phase adjusting apparatus for adjusting phases between a plurality of first splined bodies of rotation of a first mechanical unit, such as a splined stator support shaft, a splined turbine shaft and a splined oil pump shaft of a transmission unit, which are concentrically arranged so as to be rotatable independently from one another, and a plurality of second splined bodies of rotation of a second mechanical unit, such as a splined connector sleeve, a splined turbine support sleeve and a splined one-way clutch sleeve of a torque converter, which are concentrically arranged so as to be rotatable independently from one another. The first and second mechanical units, namely the transmission unit and the torque converter unit, are assembled as an automatic transmission through an engagement between the first and second splined bodies of rotation after the phase adjustment. The phase adjusting apparatus includes a first engaging means having a plurality of first concentric splined engaging members, which are rotatable independently from one another, for engaging with the first splined bodies of rotation, respectively, and a second engaging means having a plurality of second concentric splined engaging members, which are rotatable independently from one another and integrated in operation with the first concentric splined engaging members, respectively, for engaging with the second splined bodies of rotation, respectively. The first concentric splined engaging members of the first engaging means are driven independently from one another so as to adjust phases of the first concentric splined engaging members to phases of the first splined bodies of rotation, respectively. The phase adjusting apparatus further includes a restraining means for restraining the first concentric splined engaging members so as to integrate for rotation, the first concentric splined engaging members as one whole to prevent them from rotating independently from one another when an adjustment of phases between the first concentric splined engaging members and the first splined bodies of rotation is made.

Specifically, the first and second splined concentric engaging members are mechanically integrated with each other, respectively. Otherwise, they may be integrated by means of electric coupling means. Each of the first and second splined concentric engaging members is comprised of a plurality of elongated rectangular spline keys and elongated rectangular spline key grooves arranged alternately.

Before assembling a torque converter unit to a transmission unit, the phase adjusting apparatus causes the first engaging means to bring the first concentric splined engaging members of the first engaging means, in the form of splined sleeve, into engagement with the first bodies of rotation or splined shafts of the transmission unit, respectively, in order. At the completion of engagement, the second concentric engaging members of the second engaging means, in the form of splined shaft, have been adjusted in phase to the first bodies of rotation, namely the splined shafts, of the transmission unit. Then, the phase adjusting apparatus causes the first engaging means to adjust in phase the second concentric splined engaging members of the second engaging means to the second splined bodies of rotation of the torque converter and bring them into engagement with one another in order.

With the phase adjusting apparatus, since the first engaging members are independently rotatable, when they are adjusted in phase independently to the first bodies of rotation, the second engaging members are at the same phases as the first bodies of rotation. Accordingly, when bringing the second engaging members into engagement with second bodies of rotation, the first and second bodies of rotation are automatically adjusted in phase, respectively.

BRIEF DESCRIPTION OF THE DRAWINGS

The above and other objects and features of the present invention will be clearly understood from the following detailed description of preferred embodiments thereof when considered in conjunction with the accompanying drawings, in which:

FIG. 15 is longitudinal sectional view of a phase adjusting unit in accordance with another preferred embodiment of the present invention.

DETAILED DESCRIPTION OF THE PREFERRED EMBODIMENTS

Because automatic transmissions are well known, the present description will be directed to particular elements of an automatic transmission cooperating directly with a phase adjusting apparatus in accordance with the present invention. It is to be understood that parts or elements not specifically shown or described can take various forms well known to those skilled in the automobile art.

Figure 1:
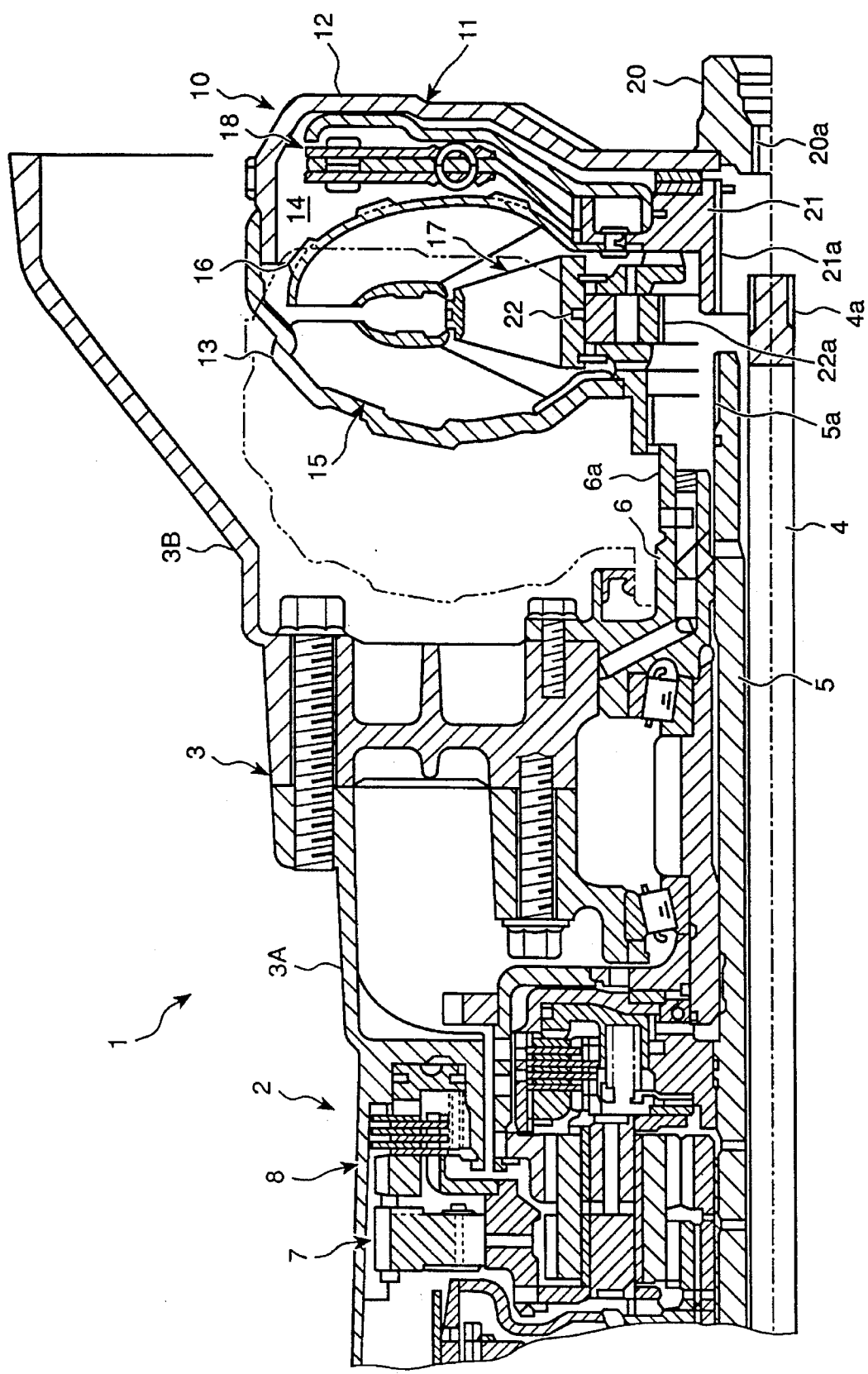
FIG. 1 is a longitudinal sectional view of an upper half section of an automatic transmission.

Before describing a method of and an apparatus for adjusting phases of bodies of rotation in accordance with a preferred embodiment of the present invention, reference is made to FIG. 1 for the purpose of providing a brief introduction to an automatic transmission, having bodies of rotation, such as rotatable bodies of a torque converter unit and transmission shafts, which are adjusted in phase while being assembled by the phase adjusting apparatus. This will enhance an understanding of the operation of the apparatus.

Referring to FIG. 1, an automatic transmission assembly 1 has a transmission unit 2, which is hereafter referred to as a first mechanical unit, and a torque converter unit 10, which is hereafter referred to as a second mechanical unit. The automatic transmission assembly 1 is incorporated within a transmission housing assembly 3 comprised of a front housing 3B generally tapered backward, and a rear housing 3A generally cylindrically shaped, which are bolted to each other. The front housing 3B incorporates the torque converter unit 10 therein, and the rear housing 3A incorporates the transmission unit 2 therein.

The transmission unit 2, mainly incorporated in the rear housing 3A, includes transmission elements, such as a planetary gear set 7, a clutch assembly 8 and their associated mechanical elements, mounted on a hollow turbine shaft 5. An oil pump shaft 4, provided with an oil pump (not shown) at its rear end, extends so that is passes through inside and coaxially with the hollow turbine shaft 5 for rotation.

The torque converter unit 10 includes, as its essential elements, a pump 15, a turbine 16, and a stator 17 and a lock-up clutch assembly 18, received within a converter housing assembly 11. This convertor housing 11 is comprised of a front converter housing 12 and a rear converter housing 13 secured to each other. The front converter housing 12, which in turn is secured to an engine output shaft (not shown), such as a crankshaft, through a connector 20, covers mainly the turbine 16, and the rear converter housing 13 covers mainly the pump 15. The torque converter unit 10 is finally placed and assembled in position as shown by double-dotted chain line in FIG. 1. The torque converter unit 10 further includes the hollow turbine shaft 5, which in turn extends rearward into and supported for rotation by the rear housing 3A. The turbine shaft 5 is coaxially fitted at its rear end for relative rotation in a hollow stator support shaft 6 secured to the front housing 3B. All these shafts 4, 5 and 6 are formed at their front end portions with a plurality of external spline keys 4a, 5a and 6a, respectively, each of which extends in the axial direction. The turbine 16 is connected to the turbine shaft 5 through a generally cylindrically shaped turbine support 21, and the stator 18 is connected to the stator support shaft 6 through a one-way clutch 22. The connector 20, the turbine support 21 and the one-way clutch 22, which are bodies of rotation, are all formed with a plurality of spline key grooves 20a, 21a and 22a, respectively. These spline keys 4a, 5a and 6a engage with the spline key grooves 20a, 21a and 22a, respectively, so as to mechanically couple the oil pump shaft 4, the turbine shaft 5 and the stator support shaft 6 with the connector 20, the turbine support 21 and the one-way clutch 22 together, respectively.

Figure 2:
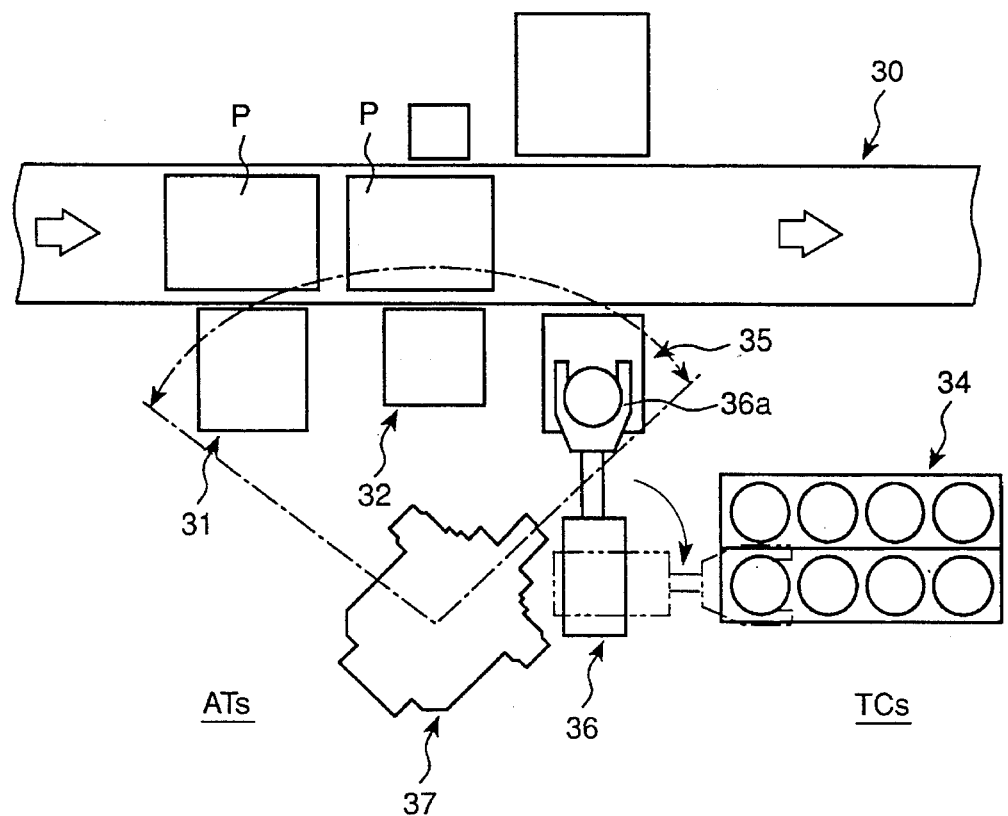
FIG. 2 is a plan view of part of an transmission assembling line.
Figure 6:
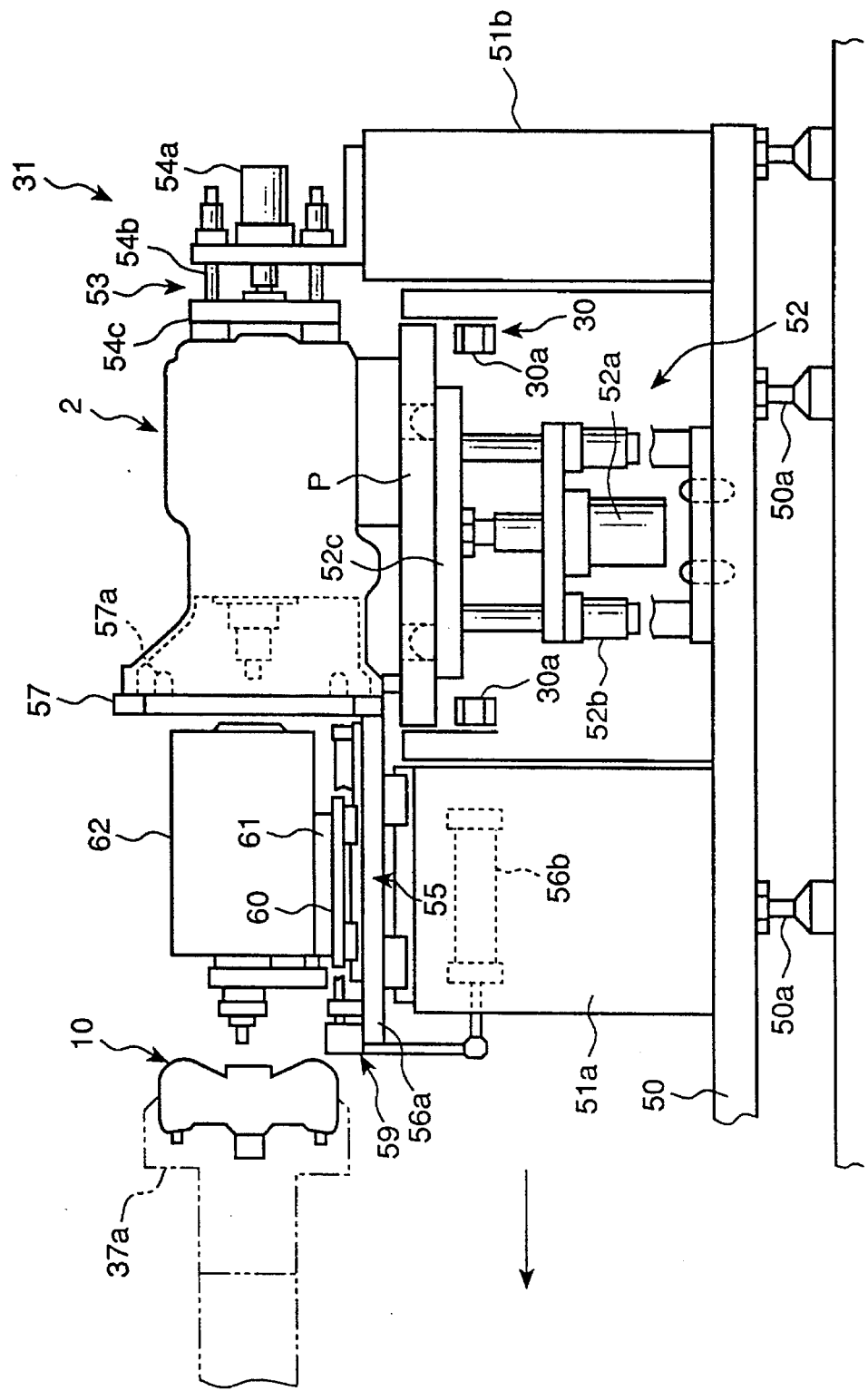
FIG. 6 is a side view of a phase adjusting apparatus.

Referring to FIG. 2, an automatic transmission assembling line 30, in which a phase adjusting apparatus in accordance with a preferred embodiment of the invention is installed, is schematically illustrated. On one side of conveyer rails 30a (see FIGS. 6 and 14) of the illustrated automatic transmission assembling line 30, there are an automatic transmission assemble station ATs and a converter supply station TCs located from an upstream side to a downstream side. In the assemble station ATs, there are installed, from the upstream side to the downstream side, a phase adjusting apparatus 31 for adjusting phases, or angular positions, of the shafts 4, 5 and 6 of the automatic transmission assembly 1 to the bodies of rotation of the torque converter unit 10, i.e. the connector 20, the turbine support 21 and the one-way clutch 22, and a transmission assembling apparatus 32 for assembling the torque converter unit 10 to the transmission unit 2. On the other hand, in the supply station TCs, there are installed a converter position changer 35, located adjacent to and downward from the transmission assembling apparatus 32, for changing a torque converter unit 10 from a horizontal position to a vertical position and a converter transfer apparatus 36, located opposite to the assembling line 30 with respect to the transmission assembling apparatus 32, for transferring a torque converter unit 10 supplied by means of a converter supply apparatus 34 to the converter position changer 35. Between the assemble station ATs and supply station TCs, there is installed a multi-articulation manipulator or robot 37 which picks up a torque converter unit 10 vertically positioned by the converter position changer 35, transfers it to the phase adjusting apparatus 31, and, after adjusting phases or relative angular positions of the shafts 4, 5 and 6 to the connector 20, the turbine support 21 and the one-way clutch 22, cooperates with the assembling apparatus 32 to assemble the torque converter unit 10 to a transmission unit 2.

Figure 3:
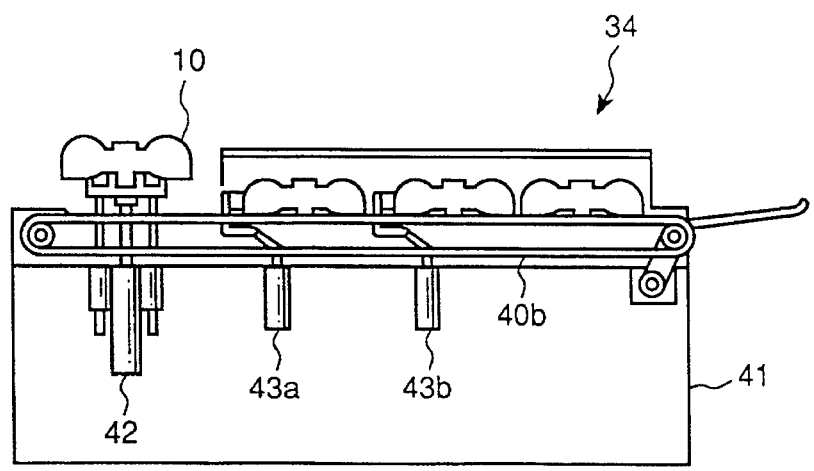
FIG. 3 is a longitudinal sectional view of a converter supply apparatus.

The converter supply apparatus 34 has a pair of belt conveyers in parallel with the conveyer rails 30a of the assembling line 30. FIG. 3 shows one such belt conveyor 40b. Each of the belt conveyers has torque converter assemblies 10 placed thereon with their rear converter housing 13 faced down in a horizontal position and supplies them toward the converter transfer apparatus 36, one after another. A base frame 41, placed on the floor (not shown), on which the belt conveyers 40 travel, is provided with a lift-up cylinder 42, located at one end thereof adjacent to the converter transfer apparatus 36, which moves up and down to lift up a torque converter unit 10. The base frame is further provided with a position control cylinder 43a and a preposition control cylinder 43b, each of which positions a torque converter unit 10 relative to the lift-up cylinder 42, and delivers it timely to the lift-up cylinder 42 one after another. Torque converter units 10, lifted up one after another by the lift-up cylinder 42, are held and transferred by a forked hand 36a of the converter transfer apparatus 36 to the converter position changer 35.

Figure 4:
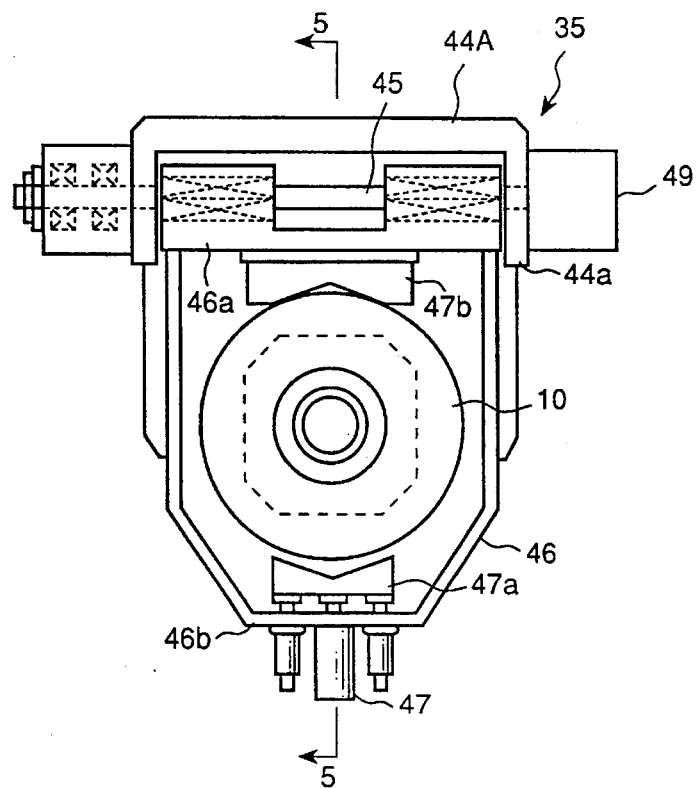
FIG. 4 is a plan view of a converter position changer.
Figure 5:
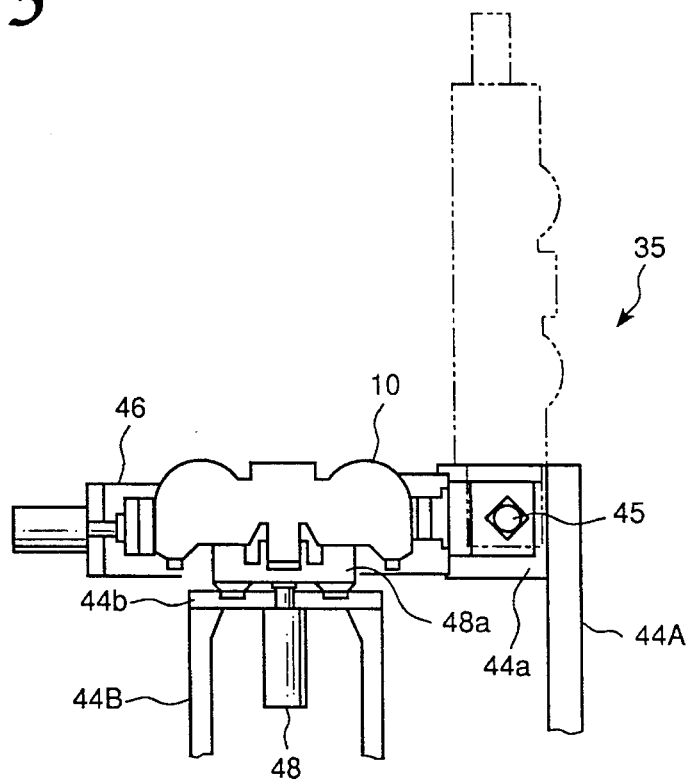
FIG. 5 is a cross-sectional view of FIG. 4 taken along line 5—5.

Referring to FIGS. 4 and 5, the converter position changer 35 has a side frame 44A standing up from the floor (not shown). The side frame 44A is provided at its top end with a support shaft 45, which extends in parallel with the conveyer rails 30a of the assembling line 30 and is supported by a bracket 44a so as to be revolved through approximately 90 degrees by an electric motor 49. The support shaft 45 supports a rectangular support frame 46 fixed thereto. The support frame 46 is provided with a stationary jaw 47b secured to one end frame member 46a and a movable clamp jaw 47a supported by another end frame member 46b opposite to the one end frame member 46a. The movable clamp jaw 47a is moved by a cylinder 47 toward the stationary clamp jaw 47b to grasp a torque converter unit 10 and away from stationary clamp jaw 47b to release it. Under the support frame 46, there is an under frame 44B with a top member 44b. A lift-up cylinder 48, attached to the top member 44b and provided with a jig plate 48a, moves up so as to receive a torque converter unit 10 on the jig plate 48a and down so as to place the torque converter unit 10 within the support frame 46. The cylinders 47 and 48 and the motor 59 are sequentially actuated so as to change a torque converter unit 10 from a horizontal position to a vertical position. That is, when the converter transfer apparatus 36 is actuated so as to grasp a torque converter unit 10 on the converter supply apparatus 34 with the forked hand 36a and turns the forked hand 36a through approximately 90 degrees in a horizontal plane so as to place the torque converter unit 10 above the jig plate 48a, the cylinder 48 is actuated to move up and receive the torque converter unit 10 on the jig plate 48a held in a horizontal position. Subsequently, it moves down to place the torque converter unit 10 within the support frame 46. Then, the cylinder 47 is timely actuated to grasp the torque converter unit 10 with and between the movable and stationary movable clamp jaws 47a and 47b. Thereafter, the motor 49 is actuated to revolve the support shaft 45 with the support frame 46 through 90 degrees. As a result of this sequential actuation of the cylinders 47 and 48, and the motor 49, the torque converter unit 10 is changed in posture from a horizontal position to a vertical position as shown by double-dotted chain line in FIG. 5.

Referring to FIGS. 6 through 10, the phase adjusting apparatus 31 in accordance with a preferred embodiment of the present invention is shown in detail. This phase adjusting apparatus 31 includes a base table 50 horizontally adjusted by a plurality of adjuster 50a. On the base table 50, there are secured front and rear stands 51a and 51b. A lift unit 52, having a cylinder 52a and guide rods 52b, is provided between the front and rear stands 51a and 51b so as to move up and down a support table 52c on which a transmission unit 2 on a pallet P is placed. The front stand 51a is provided with a front position restraint unit 55, including a base plate 56a adapted to move back and forth in an axial direction by means of a cylinder 56b, and a restraining frame 57, provided with positioning pins 57a, which extends upward at a right angle from the rear end of the base plate 56a, for restraining the transmission unit 2 in front axial position. The base plate 56a of the front position restraint unit 55 places thereon a movable table 60 provided with a support frame 61. The movable table 60 is adapted to move back and force by a ball-screw mechanism 59 so as to shift a phase adjusting unit 62 (which will be described in detail later) fixedly placed on the support frame 61. On the other hand, the rear stand 51b is provided with a rear position restraint unit 53, including a cylinder 54a, guide rods 54b and a restraining plate 54c, for restraining the transmission unit 2 in a rear axial position.

The phase adjusting unit 62 includes a cylindrical housing 63 fixedly supported on the movable table 60 through a support frame 61. The cylindrical housing 63 holds therein triple cylindrical members, in the form of barrels, for rotation relative one another. That is, a first or outer hollow cylindrical rotatable barrel 64 is air-tightly fitted in and supported for rotation by the cylindrical housing 63 through front and rear bearings 64a. Similarly, a second or interim hollow cylindrical rotatable barrel 65 is air-tightly fitted in and supported for rotation by the outer rotatable barrel 65 through front and rear bearings 65a. A third or inner solid cylindrical rotatable shaft 66 is air-tightly fitted in and supported for rotation by the interim rotatable barrel 65 through front and rear bearings 66a. The cylindrical housing 63 is provided, in close proximity to its rear end, with three first air cylinders 67 at regular angular separations for coupling the outer rotatable barrel 64 thereto so as to prohibit relative rotation therebetween when the first air cylinders 67 are activated. The outer rotatable barrel 64 is provided, midway thereof, with three second air cylinders 68 at regular angular separations for coupling the interim rotatable barrel 65 thereto so as to prohibit relative rotation therebetween when the second air cylinders 68 are activated. Similarly, the interim rotatable barrel 65 is provided, in close proximity to its front end, with three third air cylinders 69 at regular angular separations for coupling the inner rotatable shaft 66 thereto so as to prohibit relative rotation therebetween when the third air cylinders 69 are activated. As will become clear, the first, second and third air cylinders 67, 68 and 69 form restraining means. The outer rotatable barrel 64 is formed with an external annular groove 70 where the second air cylinders 68 are installed. The external annular groove 70 forms an air path in cooperation with the cylindrical housing 63 by means of which the three second air cylinders 68 are communicated with each other. The cylindrical housing 63 is formed with a radial bore 71 where one of the three second air cylinders 68, which is in position remote from the support frame 60a, is installed. The radial bore 71 is plugged with a cap 72 formed with a bore 72a. The annular groove 70 is communicated with the atmosphere through the radial bore 71. The outer rotatable barrel 64 is further formed with an internal annular groove 73 where the third air cylinders 69 are installed. The internal annular groove 73 forms an air path in cooperation with the interim rotatable barrel 65 by means of which the three third air cylinders 69 are communicated with each other. The cylindrical housing 63 and the outer rotatable barrel 64 are formed with coaxial radial bores 74 where one of the three third air cylinders 69, which is in position remote from the support frame 60a, is installed. The radial bore 74 of the cylindrical housing 63 is plugged with a cap 75 formed with a bore 75a by means of which the annular groove 73 is communicated with the atmosphere through the radial bores 74.

The outer rotatable barrel 64 has a front cylindrical extension 76, as a first output member, which is comprised of a large diameter hollow cylindrical portion 76a integrally and coaxially formed with, or otherwise secured to, the outer rotatable barrel 64 and a small diameter of hollow cylindrical portion 76b integrally and coaxially formed with the hollow cylindrical portion 76a. The first front extension 76 fixedly mounts a drive gear 77 on the annular shoulder formed between the large diameter hollow cylindrical portion 76a and small diameter hollow cylindrical portion 76b which is operationally coupled to an electric motor 79 by means of toothed timing belt 78 engaged with the drive gear 77 and an output gear 79a of the electric motor 79. The timing belt 78, output gear 79a and electric motor 79, therefore, form drive means. The first front extension 76 is further integrally formed with a plurality of external spline keys 90 around the front end portion thereof so as to be able to be coupled to the one-way clutch 22 by means of an engagement of the spline keys 90 with a plurality of spline key grooves 22a of the one-way clutch 22. On the other hand, the outer rotatable barrel 64 has a rear end disk 80 formed with a plurality of internal spline key grooves 95, as a first input member, bolted, or otherwise secured, to its rear end. The internal spline key grooves 95 of the rear end disk 80 are able to be coupled to the stator support shaft 6 through an engagement of the internal spline key grooves 95 with a plurality of spline keys 6a, respectively. The external spline keys 90 and the internal spline key grooves 95 are formed at the same pitches but are given a phase difference of a half of the pitch therebetween.

The interim rotatable barrel 65 has a front extension 81, as a second output member, which is comprised of a large diameter hollow cylindrical portion integrally and coaxially formed with, or otherwise secured to, the interim rotatable barrel 65 and a small diameter hollow cylindrical portion integrally and coaxially formed with the large diameter hollow cylindrical portion. The second front extension 81, extending outside the small diameter hollow cylindrical portion 76b of the first front extension 76 of the outer rotatable barrel 64, is integrally formed with a plurality of external spline keys 91 around the front end portion of the small diameter hollow cylindrical portion outside the small diameter hollow cylindrical portion 76b of the first front extension 76 so as to be able to be coupled to the turbine shaft 21 by means of engagement of the spline keys 91 with the spline key grooves 21a of the turbine shaft 21. On the other hand, the interim rotatable barrel 65 has a rear end disk 82 formed with an opening having a plurality of internal spline key grooves 96, as a second input member, bolted, or otherwise secured, to its rear end so as to be able to be coupled with the turbine shaft 5 through engagement of the internal spline key grooves 96 with the spline keys 5a. The external spline keys 91 and the internal spline key grooves 96 are formed at the same pitches but given a phase difference of a half of the pitch therebetween.

The inner rotatable barrel 66 has a solid front extension 83, as a third output shaft, which is coaxial with and bolted to the inner rotatable barrel 66 and extends beyond the front end of the first front extension 81 of the interim rotatable barrel 65. The third front extension 83, extending outside the small diameter hollow cylindrical portion 76b of the front extension 76 of the outer rotatable barrel 64, is integrally formed with a plurality of external spline keys 92 around the front end portion thereof so as to be able to be coupled to the connector 20 by means of an engagement of the spline keys 92 with the spline key grooves 20a of the turbine shaft 21. On the other hand, the inner rotatable barrel 66 has a rear end bore formed with an opening having a plurality of internal spline key grooves 97, as a second input member, at its rear end 84 so as to be able to be coupled with the oil pump shaft 4 through an engagement of the internal spline key grooves 97 with the spline keys 4a. The external spline keys 92 and the internal spline key grooves 97 are formed at the same pitches but given a phase difference of a half of the pitch therebetween.

These openings having the spline key grooves 95, 96 and 97 are concentrically formed in this order from the outer side to the inner side so as to be engaged with the spline keys 6a, 5a and 4a of the stator support shaft 6, the turbine shaft 5 and the oil pump shaft 4, concentrically arranged in this order, respectively. Similarly, the spline keys 90, 91 and 92 are concentrically formed in this order from the outer side to the inner side so as to be engaged with the spline key grooves 22a, 21a and 20a of the connector 20, the turbine support 21 and the one-way clutch 22 of the torque converter unit 10, concentrically arranged in this order, respectively. Thus, as will become clear, extensions 76, 81 and 83 combine to form first engaging means while disks 80, 82 and 84 combine to form second engaging means.

Figure 11:
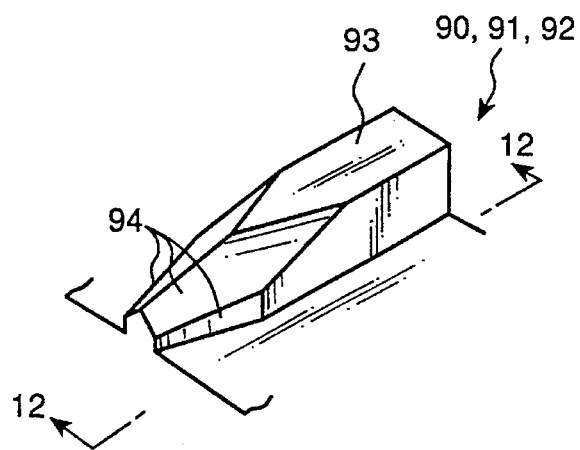
FIG. 11 is a perspective illustration of an elongated longitudinal spline key.
Figure 12:
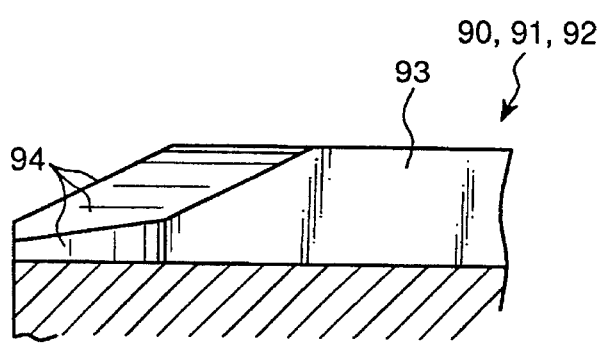
FIG. 12 is a side view of the elongated longitudinal spline key.
Figure 13:
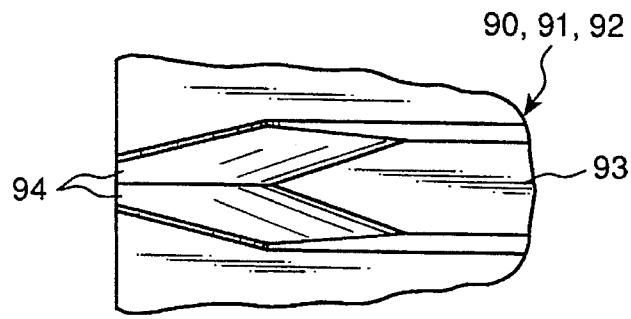
FIG. 13 is a plan view of the elongated longitudinal spline key.

Banks 93 of the spline key grooves 95–97 are formed with tapered surfaces 94 extending rearward so as to guide and bring the spline keys 6a, 5a and 4a into smooth engagement with the spline key grooves 95, 96 and 97, respectively, as shown in FIGS. 11–13. Similarly, the spline keys 90, 91 and 92 are formed with tapered surfaces (not shown) extending forward so as to guide and bring the spline key grooves 22a, 21a and 20a into smooth engagement with the spline keys 90, 91 and 92, respectively.

Figure 14:
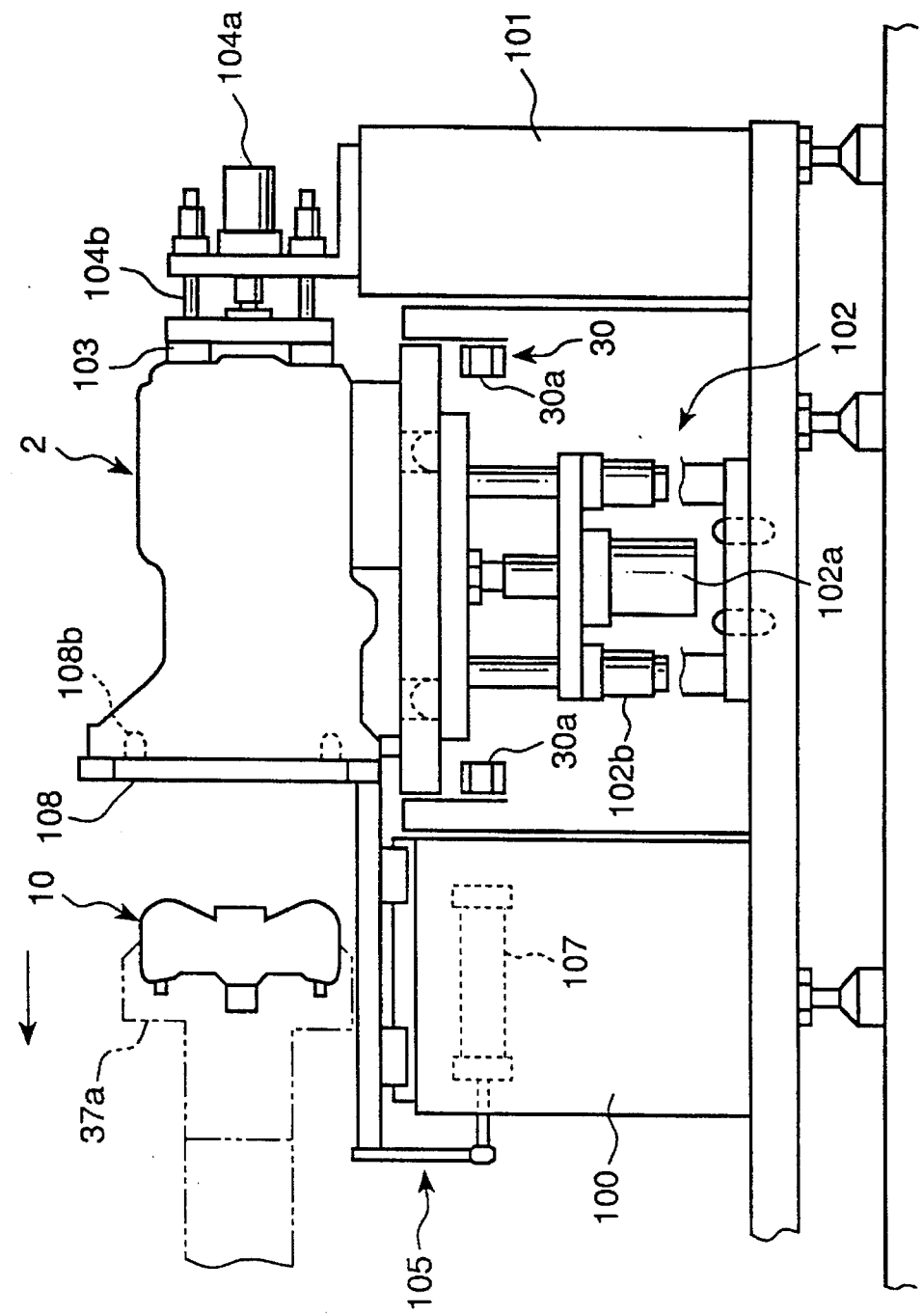
FIG. 14 is a side view of a transmission assembling apparatus.

Referring to FIG. 14, the transmission assembling apparatus 32 has front and rear stands 100 and 101 secured on a base table and disposed along the conveyer rails 30a of the assembling line 30, respectively. Between the stands 100 and 101, there is provided a lift unit 102 having a cylinder 102a and guide rods 102b along line 30 so as to move up and down a pallet P on which a transmission unit 2 is placed. On the rear stand 101 there is provided a rear position restraint unit 103, including a cylinder 104a, guide rods 104b and a restraining plate, for restraining the transmission unit 2 in rear position. On the other hand, on the front stand 100, there is provided a front position restraint unit 105, including a base plate 106, adapted to be moved back and forth in an axial direction by means of a cylinder 107, and a restraining frame 108, formed with a center opening 108a and provided with a plurality of positioning pins 108b, which extends upward at a right angle from the rear end of the base plate 106, for restraining the transmission unit 2 in axial front position. A torque converter unit 10 grasped in a vertical position by a hand 37a of the robot 37 is passed through the center opening 108a of the restraining frame 108 so as to be attached to the transmission unit 2 which is secured in position by means of the front and rear position restraint units 105 and 103.

Description will be now directed to assembling of a torque converter unit 10 to a transmission unit 2.

A foremost torque converter unit 10, placed in a horizontal position on the belt conveyer of the converter supply apparatus 34, is transferred by the converter transfer apparatus 36 to the converter position changer 35, and then, is grasped by means of the movable and stationary clamp jaws 47a and 47b in the support frame 46. The motor 49 is activated to turn the support shaft 45 fixedly supporting the support frame 46 through a right angle so as to change the torque converter unit 10 from a horizontal position to a vertical position wherein the rear converter housing 13 faces rearward. Subsequently, while the torque converter unit 10 is grasped and transferred by the hand 37a of the robot 37 to the phase adjusting apparatus 31, a transmission unit 2 placed on the pallet P is transferred to the phase adjusting apparatus 31 from the conveyer rails 30a and lifted up by means of the lift unit 52 of the phase adjusting apparatus 31 so as to be held in positioned between and by the front and rear position restraint units 55 and 53.

After the positioning of the transmission unit 2, the second and third air cylinders 68 and 69 of the phase adjusting unit 62 are activated so as to prevent the outer, interim and inner cylindrical rotatable barrels 64, 65 and 66 from rotating relative to one another. Then, the motor 79 is activated to rotate the outer, interim and inner cylindrical rotatable barrel 64, 65 and 66 as one whole and, simultaneously, the phase adjusting unit 62 is moved toward the transmission unit 2 by means of the ball-screw mechanism 59 to bring the spline keys 4a of the oil pump shaft 4 into engagement with the spline key grooves 97 of the inner rotatable barrel 66 so as to adjust phases between the oil pump shaft 4 and the inner rotatable barrel 66. Thereafter, only the second air cylinders 68 of the phase adjusting apparatus 31 are activated or maintained activated and the third air cylinders 69 are deactivated so as to prevent the outer and interim cylindrical rotatable barrel 64 and 65 from rotating relative to each other. In the same manner, the outer and interim cylindrical rotatable barrel 64 and 65 are rotated by the motor 79 as one whole and, simultaneously, while keeping the engagement between the oil pump shaft 4 to the inner rotatable barrel 66, the phase adjusting unit 62 is further moved toward the transmission unit 2 by means of the ball-screw mechanism 59 to bring the spline keys 5a of the turbine shaft 5 into engagement with the spline key grooves 96 of the interim rotatable barrel 65 so as to adjust phases between the turbine shaft 5 and the interim rotatable barrel 65. Subsequently, while keeping the engagements between the oil pump shaft 4 to the inner rotatable barrel 66 and between the turbine shaft 5 and the interim rotatable barrel 65 and all of the first to third air cylinders 67, 68 and 69 deactivated, the outer rotatable barrel 64 is rotated by the motor 79 and, simultaneously, the phase adjusting unit 62 is further moved toward the transmission unit 2 by means of the ball-screw mechanism 59 to bring the spline keys 6a of the stator support shaft 6 into engagement with the spline key grooves 95 of the outer rotatable barrel 64 so as to adjust phases between the stator support shaft 6 and the outer rotatable barrel 64.

Each of the outer, interim and inner rotatable barrels 64, 65 and 66 has the spline keys 90, 91, 92 and the spline key grooves 95, 96, 97 which are at the same pitches and given a phase difference of a half of the pitch therebetween. Therefore, when the spline key grooves 95, 96 and 97 of the phase adjusting unit 62 are engaged by the spline keys 6a, 5a and 4a of the stator support shaft 6, the turbine shaft 5 and the oil pump shaft 4 of the transmission unit 2, respectively, the phases of the spline keys 90, 91 and 92 of the phase adjusting unit 62 are adjusted with the phases of the spline keys 6a, 5a and 4a, respectively, of the transmission unit 2.

After the phase adjustment between the spline keys 90, 91 and 92 and the spline keys 6a, 5a and 4a, the first to third air cylinders 67 to 69 of the phase adjusting unit 62 are activated to operationally join the outer, interim and inner rotatable barrels 64, 65 and 66 so as to prevent them from rotating relative to the cylindrical housing 63. While keeping the first to third air cylinders 67 to 69 activated, the phase adjusting unit 62 is moved rearward toward the torque converter unit 10. Simultaneously, while having the torque converter unit 10 rotate the connector 20, the turbine support 21 and the one-way clutch 22 slowly, the torque converter unit 10, grasped by the robot hand 37a, is moved forward toward the phase adjusting unit 62 so as to bring the spline key grooves 22a, 21a and 20a of the connector 20, the turbine support 21 and the one-way clutch 22 of the torque converter unit 10 into engagement with the spline keys 90, 91 and 92 of the phase adjusting unit 62, respectively, in order. Through the respective engagements between the spline key grooves 22a, 21a and 20a and the spline keys 90, 91 and 92, the connector 20, the turbine support 21 and the one-way clutch 22 of the torque converter unit 10 are adjusted to the phases of the stator support shaft 6, the turbine shaft 5 and the oil pump shaft 4 of the transmission unit 2, respectively. In this instance, it is sufficient, for bringing the spline key grooves 22a, 21a and 20a and the spline keys 90, 91 and 92 into engagement, respectively, to cause a relative axial movement between the phase adjusting unit 62 and the torque converter unit 10.

After the phase adjustment between the stator support shaft 6, the turbine shaft 5 and the oil pump shaft 4 of the transmission unit 2 and the connector 20, the turbine support 21 and the oneway clutch 22 of the torque converter unit 10, the transmission unit 2 is transferred to and positioned by the transmission assembling apparatus 32. On the other hand, the torque converter unit 10 is moved by the robot 37 to the transmission assembling apparatus 32 so as to engage the spline key grooves 22a, 21a and 20a with the spline keys 6a, 5a and 4a of the transmission unit 2, thereby assembling the torque converter unit 10 to the transmission unit 2.

The phase adjusting unit 62 may be partially modified as shown in FIG. 15.

Figure 7:
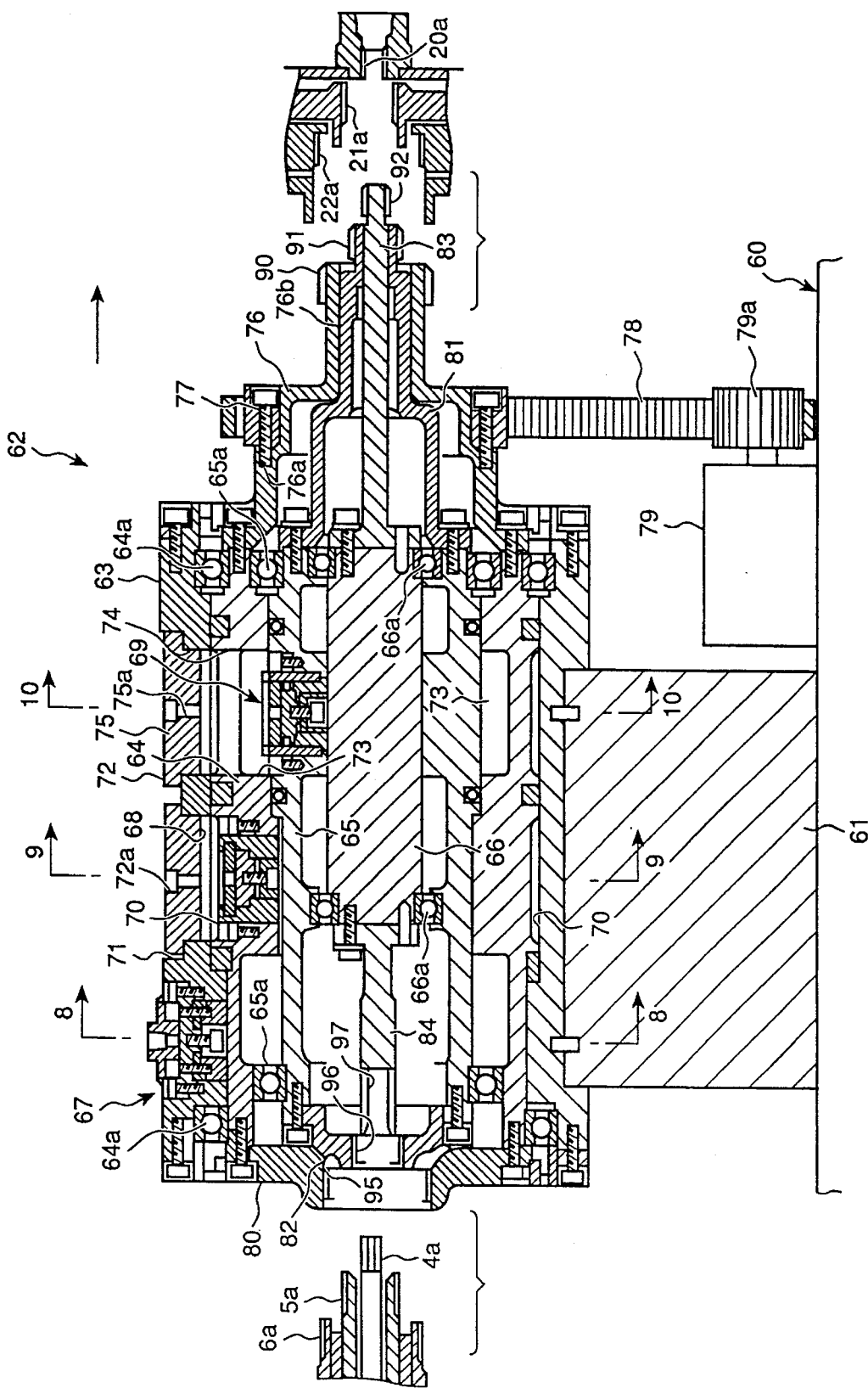
FIG. 7 is a longitudinal sectional view of a phase adjusting unit in accordance with a preferred embodiment of the present invention.
Figure 8:
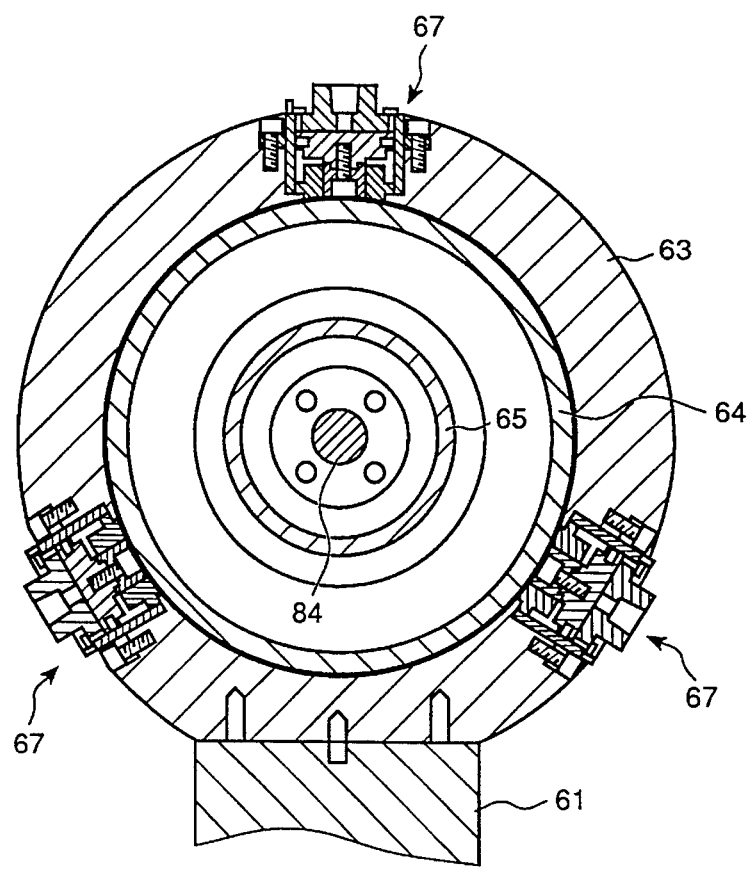
FIG. 8 is a cross-sectional view of FIG. 7 taken along line 8—8.
Figure 9:
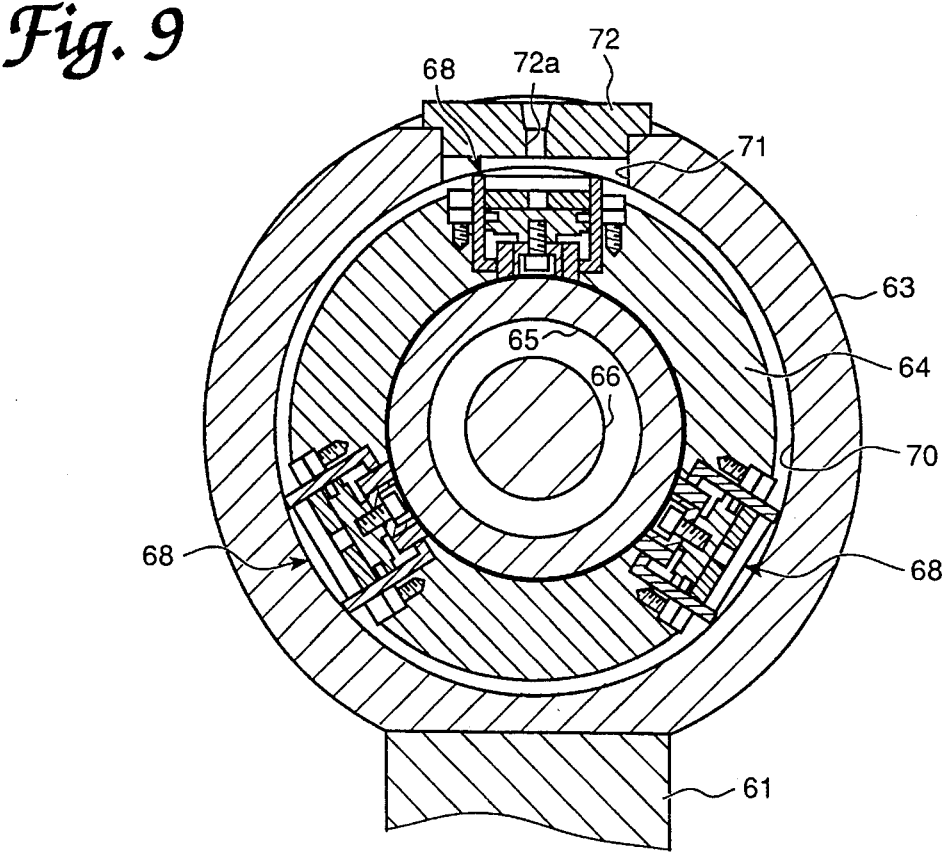
FIG. 9 is a cross-sectional view of FIG. 7 taken along line 9—9.
Figure 10:
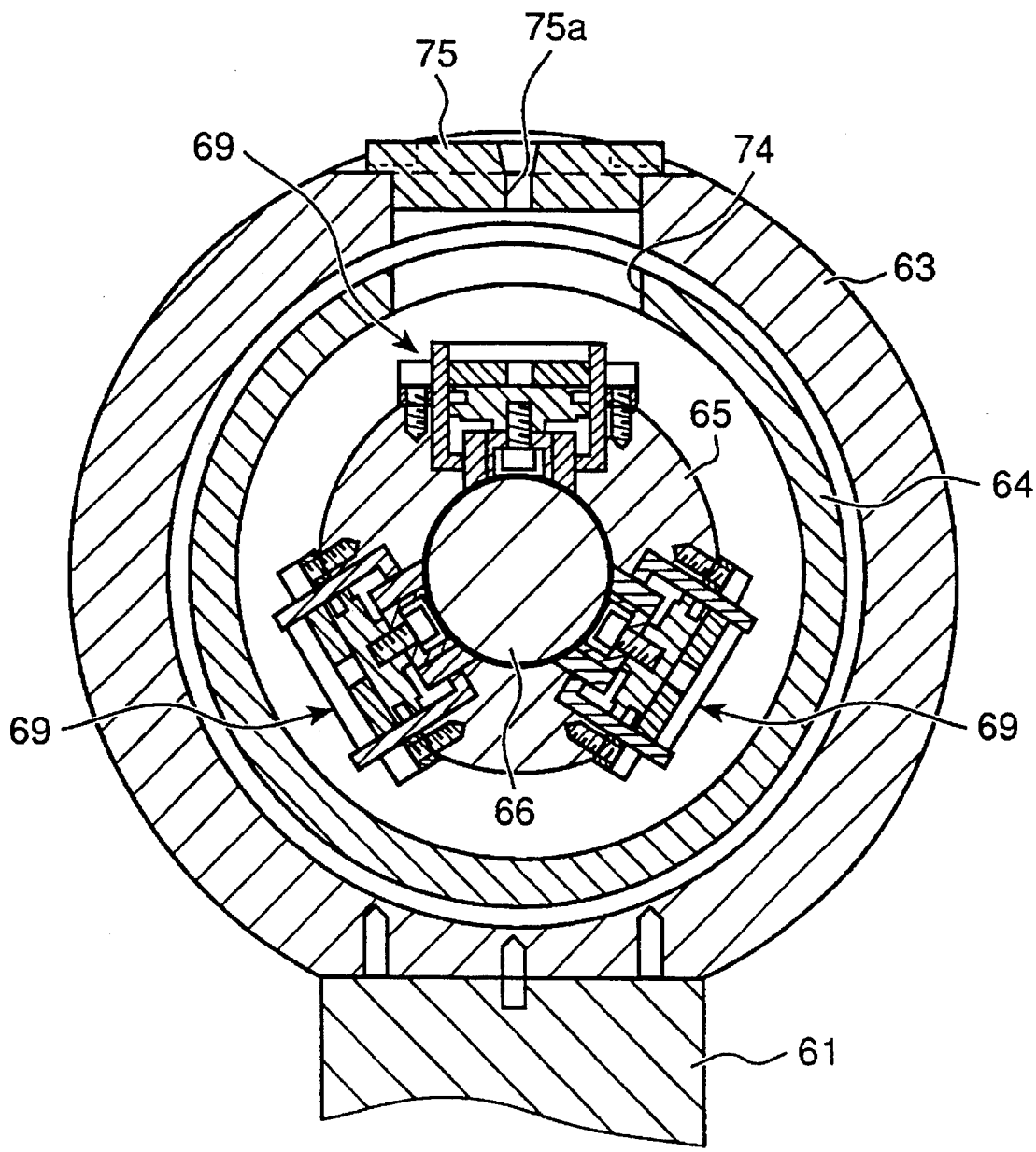
FIG. 10 is a cross-sectional view of FIG. 7 taken along line 10—10.

Referring to FIG. 15, in which similar or the same parts or elements to those of the phase adjusting unit 62 shown in FIG. 7 are designated by the same reference numbers, a phase adjusting unit 62A has a generally cylindrical, first or outer rotatable barrel 64A, supported for rotation within a cylindrical housing, a generally cylindrical, second or interim rotatable barrel 65A, supported for rotation within the outer rotatable barrel 64A, and a third or inner rotatable barrel 66A, supported for rotation within the interim rotatable barrel 65A. These outer, interim and inner rotatable barrels 64A, 65A and 66A are, respectively, formed at their front end portions with spline keys 90A, 91A and 92A, which are able to engage with spline key grooves 22a, 21a and 20a of a connector a turbine support and a one-way clutch of a torque converter unit 10, respectively. Further, the outer, interim and inner rotatable barrels 64A, 65A and 66A are, respectively, formed at their rear end portions with spline key grooves 95A, 96A and 97A, which are able to engage with spline keys 6a, 5a and 4a of an oil pump shaft, a turbine shaft, and a stator support shaft of the transmission unit 2, respectively. The cylindrical housing 63 mounts thereon three electric motors 112, to which the outer, interim and inner rotatable barrels 64A, 65A and 66A are operationally coupled by means of three timing belts 111, respectively.

With the phase adjusting apparatus 31, which is simple in structure, phases are easily adjusted between the oil pump shaft 4, the turbine shaft 5 and the stator support shaft 6 of the transmission unit 2 and the connector 20, the turbine support 21 and the one-way clutch 22, which are rotatable bodies of the torque converter unit 10, respectively, so as to realize automatic assembling of the automatic transmission assembly 1. Since phase adjusting and transmission assembling are separately made at different stations, while a torque converter unit 10 is assembled to a transmission unit 2, another transmission unit 2 can be under phase adjusting operation with the phase adjusting apparatus 61, so as to provide a great increase in transmission assembling efficiency.

It is to be understood that although the present invention has been described in detail with respect to adjusting of phases between the connector 20, turbine support 21 and one-way clutch 22 of the torque converter unit 10, which are rotatable bodies, and the oil pump shaft 4, turbine shaft 5, and stator support shaft 6 of the transmission unit 2, the phase adjusting apparatus of the present invention may be applied to phase adjustment between rotatable bodies and shafts to be assembled together of, for instance, machine tools and industrial machines.

It is also to be understood that various other embodiments and variants may occur to those skilled in the art. Such other embodiments and variants fall within the scope and spirit of the invention and are intended to be covered by the following claims.

What is claimed is:

1. A phase adjusting apparatus for adjusting rotational angular phases between a plurality of first bodies of rotation of a first mechanical unit, said first bodies of rotation being concentrically arranged so as to be rotatable independently from one another, and a plurality of second bodies of rotation of a second mechanical unit, said second bodies of rotation being concentrically arranged so as to be rotatable independently from one another, said second mechanical unit adapted to be assembled to the first mechanical unit through engagement between said first and second bodies of rotation, said phase adjusting apparatus comprising:

first engaging means, having a plurality of first concentric engaging members which are rotatable independently from one another, for engaging with said first bodies of rotation;

second engaging means, having a plurality of second concentric engaging members which are rotatable independently from one another and operationally integrated with said first concentric engaging members, respectively, for engaging with said second bodies of rotation;

drive means for rotating said first concentric engaging members of said first engaging means independently from one another so as to adjust rotational angular phases of said first concentric engaging members to rotational angular phases of said first bodies of rotation, respectively; and restraining means for restraining said first concentric engaging members so as to prevent them from rotating independently from one another upon an adjustment of rotational angular phases between said first concentric engaging members and said first bodies of rotation.

2. A phase adjusting apparatus as defined in claim 1, wherein each of said second concentric engaging members is mechanically integrated with a respective one of said first concentric engaging members.

3. A phase adjusting apparatus as defined in claim 2, wherein said first and second concentric engaging members are formed at opposite ends of generally cylindrical barrels, respectively, which are concentric with one another.

4. A phase adjusting apparatus as defined in claim 3, wherein said restraining means includes air cylinders which are selectively operated so as to operationally couple one of said generally cylindrical barrels to an adjacent one of said generally cylindrical barrels.

5. A phase adjusting apparatus for adjusting rotational angular phases between a plurality of first splined bodies of rotation of a first mechanical unit, said first splined bodies of rotation being concentrically arranged so as to be rotatable independently from one another, and a plurality of second splined bodies of rotation of a second mechanical unit, said second bodies of rotation being concentrically arranged so as to be rotatable independently from one another, said second mechanical unit adapted to be assembled to the first mechanical unit through spline engagement between said first and second splined bodies of rotation, said phase adjusting apparatus comprising:

first engaging means, having a plurality of first concentric splined engaging members which are rotatable independently from one another, for engaging with said first bodies of rotation;

second engaging means, having a plurality of second concentric splined engaging members which are rotatable independently from one another and operationally integrated with said first concentric splined engaging members, respectively, for engaging with said second bodies of rotation;

drive means for driving independently said first concentric splined engaging members so as to adjust rotational angular phases of said first concentric splined engaging members to rotational angular phases of said first splined bodies of rotation, respectively; and restraining means for restraining said first concentric splined engaging members upon an adjustment of rotational angular phases between said first concentric splined engaging members and said first splined bodies of rotation.

6. A phase adjusting apparatus as defined in claim 5, wherein each of said second concentric splined engaging members is mechanically integrated with a respective one of said first concentric splined engaging members.

7. A phase adjusting apparatus as defined in claim 6, wherein each of said first and second concentric splined engaging members comprises a plurality of alternately arranged elongated rectangular spline keys and spline key grooves.

8. A phase adjusting apparatus as defined in claim 7, wherein each of said elongated rectangular spline keys is formed at one end with tapered top and side surfaces facing a corresponding one of said first and second splined bodies of rotation.

9. A method of adjusting phases between a plurality of first bodies of rotation of a first mechanical unit and an identical number of second bodies of rotation of a second mechanical unit comprising the steps of:

engaging a plurality of first concentric engaging members, which are rotatable independently from one another, with said plurality of first bodies of rotation of said first mechanical unit;

integrating a plurality of second concentric engaging members, which are rotatable independently from one another, and said first concentric engaging members together in rotational angular phase; and engaging said second concentric engaging members with said second bodies of rotation of said second mechanical unit.

* * * * *